United States Patent
Danihelka et al.

(10) Patent No.: US 10,657,436 B2
(45) Date of Patent: *May 19, 2020

(54) GENERATIVE NEURAL NETWORKS

(71) Applicant: DeepMind Technologies Limited, London (GB)

(72) Inventors: Ivo Danihelka, London (GB); Danilo Jimenez Rezende, London (GB); Shakir Mohamed, London (GB)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,334

(22) Filed: Jan. 7, 2019

(65) Prior Publication Data
US 2019/0213469 A1 Jul. 11, 2019

Related U.S. Application Data

(63) Continuation of application No. 15/424,708, filed on Feb. 3, 2017, now Pat. No. 10,176,424.

(Continued)

(51) Int. Cl.
*G06N 3/04* (2006.01)
*G06K 9/62* (2006.01)
(Continued)

(52) U.S. Cl.
CPC ......... *G06N 3/0445* (2013.01); *G06K 9/6257* (2013.01); *G06K 9/66* (2013.01); *G06N 3/0472* (2013.01); *G06N 3/084* (2013.01)

(58) Field of Classification Search
None
See application file for complete search history.

(56) References Cited

U.S. PATENT DOCUMENTS

2014/0229158 A1* 8/2014 Zweig ............... G06N 3/04
704/9
2017/0220854 A1* 8/2017 Yang ............... G06K 9/00335
(Continued)

FOREIGN PATENT DOCUMENTS

| CN | 102722714 | 10/2012 |
|----|-----------|---------|
| CN | 103400147 | 11/2013 |
| JP | H0635884 | 2/1994 |

OTHER PUBLICATIONS

Gregor, Karol, et al. "DRAW: A recurrent neural network for image generation." arXiv preprint arXiv:1502.04623 (2015). (Year: 2015).*

(Continued)

*Primary Examiner* — Andrae S Allison
(74) *Attorney, Agent, or Firm* — Fish & Richardson P.C.

(57) ABSTRACT

Methods, systems, and apparatus, including computer programs encoded on a computer storage medium, for a neural network system. In one aspect, a neural network system includes a recurrent neural network that is configured to, for each time step of a predetermined number of time steps, receive a set of latent variables for the time step and process the latent variables to update a hidden state of the recurrent neural network; and a generative subsystem that is configured to, for each time step, generate the set of latent variables for the time step and provide the set of latent variables as input to the recurrent neural network; update a hidden canvas using the updated hidden state of the recurrent neural network; and, for a last time step, generate an output image using the updated hidden canvas for the last time step.

20 Claims, 8 Drawing Sheets

Related U.S. Application Data

(60) Provisional application No. 62/292,186, filed on Feb. 5, 2016.

(51) Int. Cl.
*G06K 9/66* (2006.01)
*G06N 3/08* (2006.01)

(56) References Cited

U.S. PATENT DOCUMENTS

| | | | | |
|---|---|---|---|---|
| 2017/0220925 | A1* | 8/2017 | Alsharif | G06N 3/02 |
| 2017/0228643 | A1* | 8/2017 | Kurach | G06N 3/08 |
| 2017/0262705 | A1* | 9/2017 | Li | G06K 9/00718 |
| 2017/0293543 | A1* | 10/2017 | Xu | G06F 11/2263 |
| 2017/0293804 | A1* | 10/2017 | Min | G06K 9/00744 |
| 2017/0323636 | A1* | 11/2017 | Xiao | G10L 15/16 |
| 2018/0025257 | A1* | 1/2018 | van den Oord | G06K 9/66 |
| 2018/0046912 | A1* | 2/2018 | Kurata | G06N 3/063 |

OTHER PUBLICATIONS

Rezende, D., Danihelka, I., Gregor, K., & Wierstra, D. (Jun. 2016). One-shot generalization in deep generative models. In International Conference on Machine Learning (pp. 1521-1529). (Year: 2016).*
Oord et al, Pixel Recurrent Neural Networks, Proceedings of The 33rd International Conference on Machine Learning, PMLR 48: 1747-1756, 2016 (Year: 2016).*
Visin, Francesco, et al. "Renet: A recurrent neural network based alternative to convolutional networks." arXiv preprint arXiv: 1505.00393 (2015). (Year: 2015).*
Chung, Junyoung, et al. "A recurrent latent variable model for sequential data." Advances in neural information processing systems. 2015. (Year: 2015).*
Ba et al. "Learning wake-sleep recurrent attention models," NIPS, 2015,9 pages.
Burda et al. "Importance weighted autoencoders," arXiv preprint arXiv Nov. 7, 2016, 14 pages.
Chikkerur et al. "What and where: A Bayesian inference theory of attention," Vision and research, 20(22), Oct. 28, 2010, 15 pages.
Chung, Junyoung et al. "A recurrent latent variable model for sequential data," Advances in neural information processing systems, 2015.
Erdogan et al. "An analysis-by-synthesis approach to multisensory object shape perception," NIPS 2015, 7 pages.
Eslami et al. "Attend, Infer, Repeat: Fast scene understanding with generative models," arXiv preprint arXiv1603.08575, Aug. 12, 2016, 17 pages.
Gregor et al. "Deep autoregressive networks," arXiv preprint arXiv 1310.8499v2 May 20 2014, 9 pages.
Gregor et al. "DRAW: A recurrent neural network for image generation," arXiv preprint arXiv 1502.04623, May 20, 2015, 10 pages.
Gross et al. "Multi-pie," Image and Vision Computing, 28(5), May 31, 2010, 21 pages.
Hochreiter et al. "Long short-term memory," Neural computation, 9(8), Nov. 15, 1997, 46 pages.
Huang et al. "Efficient inference in occlusion-aware generative models of images," arXiv preprint arXiv 1511.06362, Nov. 19, 2015, 10 pages.
International Search Report and Written Opinion issued in International Application No. PCT/US2017/016594, dated Jun. 22, 2017, 18 pages.
Jaderberg et al. "Spatial transformer networks," arXiv preprint arXiv 1506.02025v3, Feb. 4, 2016, 15 pages.
Jaderberg et al. "Spatial transformer networks," NIPS, 2015, 9 pages.
Jordan et al. "An introduction to variational methods for graphical models," Machine learning, 37(2), Nov. 1, 1999, 51 pages.
Kaiser et al. "Neural GPUs learn algorithms," arXiv preprint arXiv1511.08228, Nov. 25, 2015, 9 pages.
Kingma et al. "Auto-encoding variational Bayes," arXiv preprint arXiv 1312.6114, Jan. 4, 2014, 14 pages.
Lake et al. "Human-level concept learning through probabilistic program induction," Science 350(6266), Dec. 11, 2015, 8 pages.
Mansimov et al. "Generating images from captions with attention," arXiv preprint arXiv1511.02793, Feb. 29, 2016, 12 pages.
Mnih et al. "Neural variational inference and learning in belief networks," arXiv preprint artXiv1402.0030, Jan. 31, 2014, 10 pages.
Mnih et al. "Recurrent models of visual attention," NIPS, 2014, 9 pages.
Nair et al. "Analysis-by-synthesis by learning to invert generative black boxes," Artificial Neural Networks—ICANN, 2008, 10 pages.
Netzer et al. "Reading digits in natural images with unsupervised feature learning," NIPS workshop on deep learning and unsupervised feature learning, 2011(2), Dec. 2011, 9 pages.
Oord et al, Pixel Recurrent Neural Networks, Proceedings of The 33rd International Conference on Machine Learning, PMLR 48:1747-1756, 2016.
Ranganath,"Black box variational inference," AISTATS, Apr. 2, 2014, 9 pages.
Rezende et al. "One-Shot Generalization in Deep Generative Models," arXiv preprint arXiv 1603.05106v2 May 25, 2016, 10 pages.
Rezende et al. "Stochastic backpropagation and approximate inference in deep generative models," arXiv preprint arXiv1401.4082, May 30, 2014, 14 pages.
Rezende et al. "Variational inference with normalizing flows," arXiv preprint arXiv1505.05770, May 21, 2015, 10 pages.
Salakhutdinov et al. "A Learning with hierarchical-deep models," IEEE Transactions on Pattern Analysis and Machine Intelligence, 35(8) Aug. 2013, 15 pages.
Salakhutdinov et al. "On the quantitive analysis of deep belief networks," Proceedings of the $25^{th}$ International Conference on Machine Learning, ACM, Jul. 5, 2008, 8 pages.
Tang et al. "Learning generative models with visual attention," arXiv preprint arXiv1312.6110, Feb. 21, 2015, 12 pages.
Visin, F., Kastner, K., Cho, K., Matteucci, M. Courville, A., &Bengio, Y. (2015) Renet: A recurrent neural network based alternative to convolutional networks, arXiv preprint arXiv 1505.00393.
Xu et al. "Show, attend and tell: Neural image caption generation with visual attention," ICML, Jun. 1, 2015, 10 pages.
Yuille et al. "Vision as Bayesian inference: analysis by synthesis?" Trends in cognitive science, 10(7), Jul. 31, 2006, 16 pages.
CN Office Action in Chinese Appln. No. 201780015370.4, dated Jul. 18, 2019, 11 pages (with English translation).
CN Office Action in Chinese Appln. No. 201780015370.4, dated Jan. 2, 2020, 15 pages (with English translation).

* cited by examiner

GENERATIVE NEURAL NETWORKS

CROSS REFERENCE TO RELATED APPLICATIONS

This is a continuation of U.S. application Ser. No. 15/424,708, filed on Feb. 3, 2017, which claims priority to U.S. Provisional Application No. 62/292,186, filed on Feb. 5, 2016. The disclosures of the prior applications are considered part of and are incorporated by reference in the disclosure of this application.

BACKGROUND

This specification relates to neural network architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

In general, one innovative aspect of the subject matter described in this specification can be embodied in a neural network system implemented by one or more computers, the neural network system including: a recurrent neural network that is configured to, for each time step of a predetermined number of time steps, receive a set of latent variables for the time step and process the set of latent variables to update a hidden state of the recurrent neural network; and a generative subsystem that is configured to: for each time step of the predetermined number of time steps: generate the set of latent variables for the time step and provide the set of latent variables as input to the recurrent neural network; update a hidden canvas using the updated hidden state of the recurrent neural network; and for a last time step of the predetermined number of time steps: generate an output image, or other output data item, using the updated hidden canvas for the last time step.

Another innovative aspect of the subject matter described in this specification can be embodied in methods including the operations that the generative subsystem of the previous aspect is configured to perform. Another innovative aspect of the subject matter described in this specification can be embodied in one or more computer storage media encoded with instructions that, when executed by one or more computers, cause the one or more computers to implement the system of the above aspect.

Another innovative aspect of the subject matter described in this specification can be embodied in methods including the operations that the neural network system of the above aspect is configured to perform.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Implementations can include one or more of the following features. In one implementation the recurrent neural network is a long short-term memory (LSTM) neural network. In an implementation updating the hidden canvas using the updated hidden state of the recurrent neural network includes: generating a write for the time step by processing the hidden state using a writing mechanism; and applying a canvas function to the write to combine the write with the hidden canvas to generate the updated hidden canvas for the time step. In an implementation the writing mechanism is an attention-based writing mechanism. In an implementation the attention-based writing mechanism uses a spatial transformers function. In an implementation the canvas function is an additive canvas function. In an implementation the canvas function is a gated recurrent canvas function. In an implementation generating an output image using the updated hidden canvas for the last time step includes: mapping the updated hidden canvas for the last time step to sufficient statistics of a likelihood model using an observation function; and generating the output image by sampling from the likelihood model. In an implementation generating the set of latent variables for the time step includes sampling the latent variables from a prior distribution. In an implementation the output image is a reconstruction of an input image, and the neural network system further includes: an inference subsystem, wherein the inference subsystem is configured to, for each of the predetermined number of time steps: generate a sprite representation of the input image by applying a reading function to the input image and the hidden state of the recurrent neural network; determine parameters of a distribution of latent variables using the sprite representation and the hidden state of the recurrent neural network; and sample the set of latent variables for the time step from the distribution in accordance with the determined parameters.

Another innovative aspect of the subject matter described in this specification can be embodied in a generative subsystem for a neural network system, the generative subsystem implemented by one or more computers and configured to: for each time step of a predetermined number of time steps: receive, from a recurrent neural network of the neural network system, an updated hidden state of the recurrent neural network; generate a set of latent variables for the time step and provide the set of latent variables as input to the recurrent neural network; and update a hidden canvas using the updated hidden state of the recurrent neural network; and, for a last time step of the predetermined number of time steps, generate an output image using the updated hidden canvas for the last time step. Another innovative aspect of the subject matter described in this specification can be embodied in a generative subsystem for a neural network system, the generative subsystem implemented by one or more computers and configured to perform a method as described herein The subject matter described in this specification can be implemented in particular embodiments so as to realize one or more of the following advantages. Computational tasks that require generating the reconstruction of input data can be performed in a sequential manner using recurrent neural networks. The attention and canvas writing mechanisms of neural network systems can be improved to allow for enhanced generative and inferential outcomes, and this can reduce the time and/or resources required to generate an output data item. The neural network systems described in this specification can accurately perform one-shot generalization.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
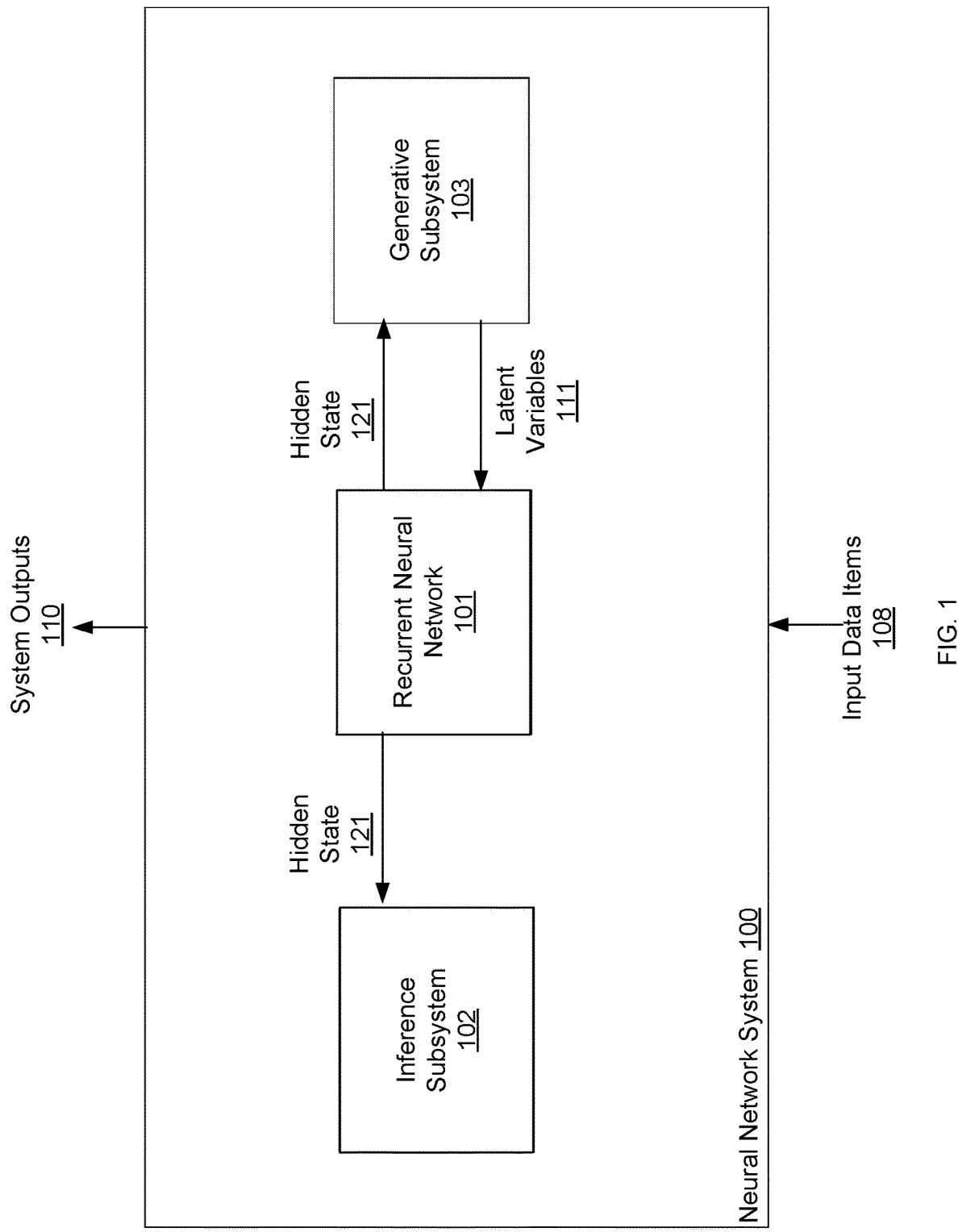
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 obtains input data items and processes the input data items to generate a respective system output for each input data item, e.g., a system output 110 for an input data item 108.

The system output of the neural network system 100 for a given input data item may be a reconstructed version of the input data item 108. For example, the input data items, e.g., input data item 108, may be an image or a video frame and the generated system output may be a reconstructed image or video.

The neural network system 100 includes a generative subsystem 103 and recurrent neural network 101. The neural network subsystem may also optionally include an inference subsystem 102.

Generally, the neural network system 100 iteratively generates a system output for an input data item by processing information obtained from the input data item for multiple time steps. The number of time steps for which the neural network system 100 processes may be considered a free parameter to be specified in advance.

In particular, the generative subsystem 103 is configured to, for each of the multiple time steps, receive an updated hidden state 121 of the recurrent neural network 101 and update a hidden canvas using the updated hidden state 121. The hidden canvas for an input data item is a set of hidden variables that represent characteristics of the input data item and can be used to reconstruct the input data item. In particular, when the system output is an image, the hidden canvas can be represented as a grid that has one or more values at each of multiple spatial locations. In some implementations, the hidden canvas has the same spatial dimensions as the system output image. In some other implementations, the hidden canvas has different spatial dimensions from the system output image.

In some implementations, by updating the hidden canvas at each time step, the generative subsystem 103 uses the output of the processing performed by the recurrent neural network 101 in sequentially generating the system output 110.

Updating the hidden canvas at a given time step is described in greater detail below with reference to FIG. 4.

In some implementations, by sequentially generating the system output 110, the neural network system 100 can perform one-shot generalization, i.e., i.e., the task of analyzing an input data item once and generate new data items based on the input data item that capture some characteristics of the input data item. The neural network system 100 accomplishes this task by generating its system output in multiple time steps, at each time step using the feedback provided by the preceding time steps.

Performing one shot generalization using the neural network system 100 is described in greater detail below with reference to FIG. 7. Training the neural network system 100 to perform one shot generalization is described in greater detail below with reference to FIG. 8.

The generative subsystem 103 is also configured to generate a set of latent variables 111 for each time step and provide the set of latent variables 111 as an input to the recurrent neural network 101.

When the neural network system 100 generates a reconstruction of the input data item 108 as the system output, the generative subsystem 103 may generate the set of latent variables 111 for a time step based on a sprite representation of the input data item 108.

In some of those implementations, the generative subsystem 103 may obtain the set of latent variables from the inference subsystem 102, which uses a sprite representation of the input image in sampling latent variables used at each time step by the neural network system 100.

In some implementations, the respective sets of latent variables 111 for different time steps have a non-linear dependency relationship with each other, such as a hierarchical relationship in which one set of latent variables 111 depend on another set of latent variables 111 in a non-linear way.

In some of those implementations, the recurrent neural network 101 may include a plurality of stacked recurrent neural network layers, where updated hidden state values produced by nodes of a particular recurrent neural network layer are deemed as a set of latent variables for a recurrent neural network layer stacked on top of the particular recurrent neural network layer.

After the last time step of the multiple time steps, the generative subsystem 103 generates an output image using the updated hidden canvas for the last time step. The output image may be a reconstruction of the input data item or a new data item. Generating a reconstruction of the input data item using the final hidden canvas is described in greater detail below with reference to FIGS. 2 and 4. Generating a new data item using the final hidden canvas is described in greater detail below with reference to FIG. 3.

The recurrent neural network 101 is a recurrent neural network that is configured to, at each of the time steps, receive inputs for the time step, i.e., a set of latent variables 111 for the time step received from the generative subsystem 103, and process the inputs to update a hidden state 121 of the neural network 101.

In some implementations, the inputs to recurrent neural network 101 for each time step also include a measure of contribution of external contextual information associated with the input data item. In some of those implementations, such a measure is generated by a neural network (not shown) that, for each time step, receives as inputs the updated hidden state of the recurrent neural network 101 for a preceding time step and the external contextual information for the input data item and processes those inputs to generate the measure of the contribution of external contextual information.

The external contextual information can include any piece of information about the input data item 108 that is not captured by the internal contents (e.g., the content of pixels) of the input data item 108. For instance, the external contextual information may include a date of creation of the input data item 108.

The recurrent neural network provides the updated hidden state 121 at each time step to the generative subsystem 103. The generative subsystem 103 uses the updated hidden state 121 of the recurrent neural network 101 for each time step to update the hidden canvas for the time step.

In some implementations, the recurrent neural network 101 is a long short-term memory (LSTM) neural network that include one or more LSTM neural network layers, with each of the LSTM layers including one or more LSTM memory blocks. Each LSTM memory block can include one or more cells that each include an input gate, a forget gate, and an output gate that allow the cell to store previous activations generated by the cell, e.g., as a hidden state for use in generating a current activation or to be provided to other components of the LSTM neural network. An example LSTM neural network is described in more detail in "Generating sequences with recurrent neural networks," Alex Graves, available at http://arxiv.org/abs/1308.0850v5.

In some implementations in which the system output 110 is a reconstruction of an input image, the inference subsystem 102 is configured to sample the set of latent variables 111 for each time step. Sampling the set of latent variables 111 for each time step during the reconstruction of an input image is described in greater detail below with reference to FIG. 6.

In some implementations, the parameters of the distribution of latent variables include a mean and variance of that distribution.

Once the neural network system 100 is trained to generate a reconstruction of an input data item, the neural network system 100 can be used to generate new data items by randomly sampling from a distribution of latent variables of multiple input data items obtained during training. Generating a new data item using the neural network system 100 is described in greater detail below with reference to FIG. 3.

Figure 2:
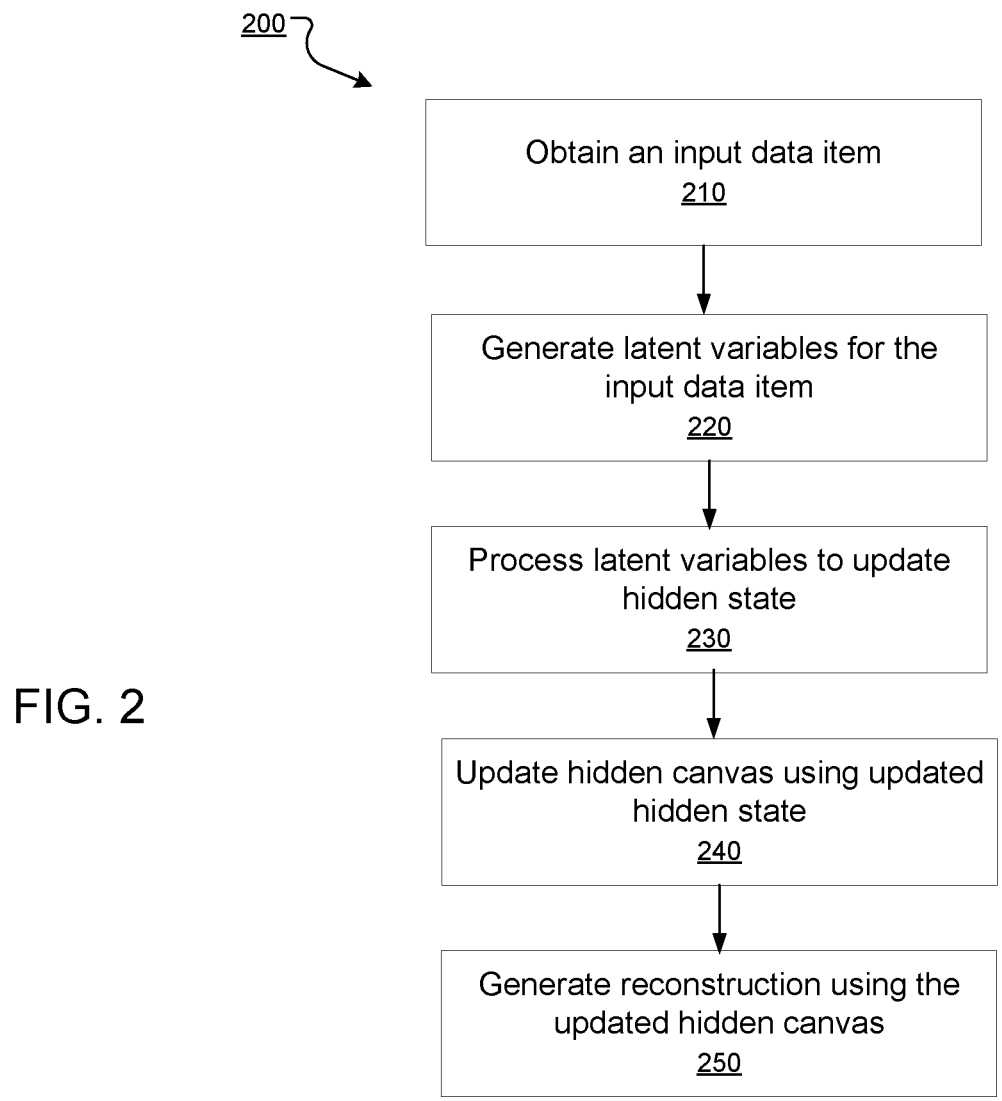
FIG. 2 is a flow chart of an example process for generating a reconstruction of an input data item.

FIG. 2 is a flow chart of an example process 200 for generating a reconstruction of an input data item. For convenience, the process 200 will be described as being performed by a system of one or more computers located in one or more locations. For example, a neural network system, e.g., the neural network system 100 of FIG. 1, appropriately programmed in accordance with this specification, can perform the process 200.

The system obtains the input data item (210).

At each time step of multiple time steps, the system generates a set of latent variables for the input data item (220). For example, this may be performed by the generative subsystem of a neural network system such as the neural network system 100 of FIG. 1. The system generates the set of latent variables based on information obtained from the input data item.

In some implementations, the system samples the set of latent variables based on a reduced representation of the input data item, e.g., a sprite representation of an input image. Sampling latent variables based on a sprite representation of an input image is further described below with reference to FIG. 6.

At each time step, the system processes the set of latent variables for the time step using a recurrent neural network to update the hidden state of the recurrent neural network (230).

At each time step, the system uses the updated hidden state of the recurrent neural network for the time step to update a hidden canvas (240). For example, this may be performed by the generative subsystem of a neural network system such as the neural network system 100 of FIG. 1. Updating the hidden canvas at each time step is described in greater detail below with reference to FIG. 4.

The system uses the updated hidden canvas obtained after the final time step of the multiple time steps to generate the reconstruction of the input data item as an output data item (250). For example, this may be performed by the generative subsystem of a neural network system such as the neural network system 100 of FIG. 1. Generating a data item using a final hidden canvas is described in greater detail below with reference to FIG. 5.

Figure 3:
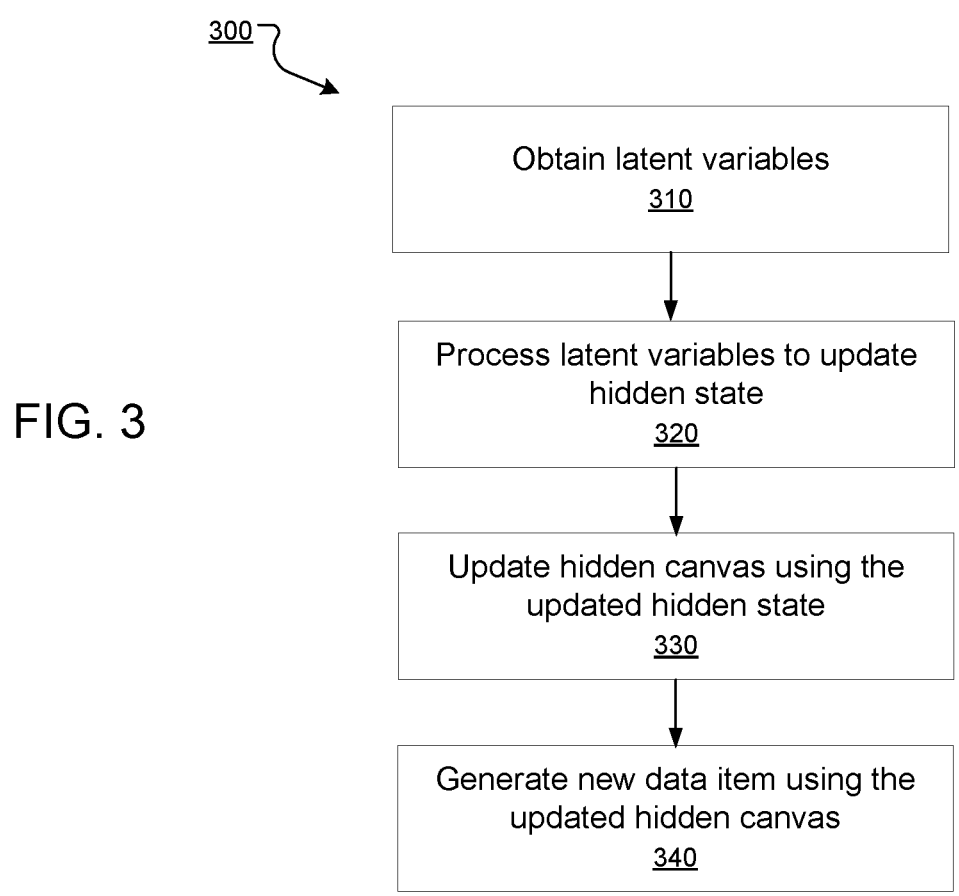
FIG. 3 is a flow chart of an example process for generating a new data item.

FIG. 3 is a flow chart of an example process 300 for generating a new data item. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system obtains a set of latent variables for each time step of multiple time steps (310). The system samples the set of latent variables from a distribution of latent variables. In some implementations, the sampling is performed using a random sampling technique.

At each time step, the system processes the set of latent variables for the time step using a recurrent neural network to update the hidden state of the recurrent neural network (320).

At each time step, the system uses the updated hidden state to update a hidden canvas (330). For example, this may be performed by the generative subsystem of a neural network system such as the neural network system 100 of FIG. 1. Updating the hidden canvas at each time step is described in greater detail below with reference to FIG. 4.

The system uses the updated hidden canvas obtained after a final time step of the multiple time steps to generate a new data item (340). For example, this may be performed by the generative subsystem of a neural network system such as the neural network system 100 of FIG. 1. Generating a data item using a final hidden canvas is described in greater detail below with reference to FIG. 5.

Figure 4:
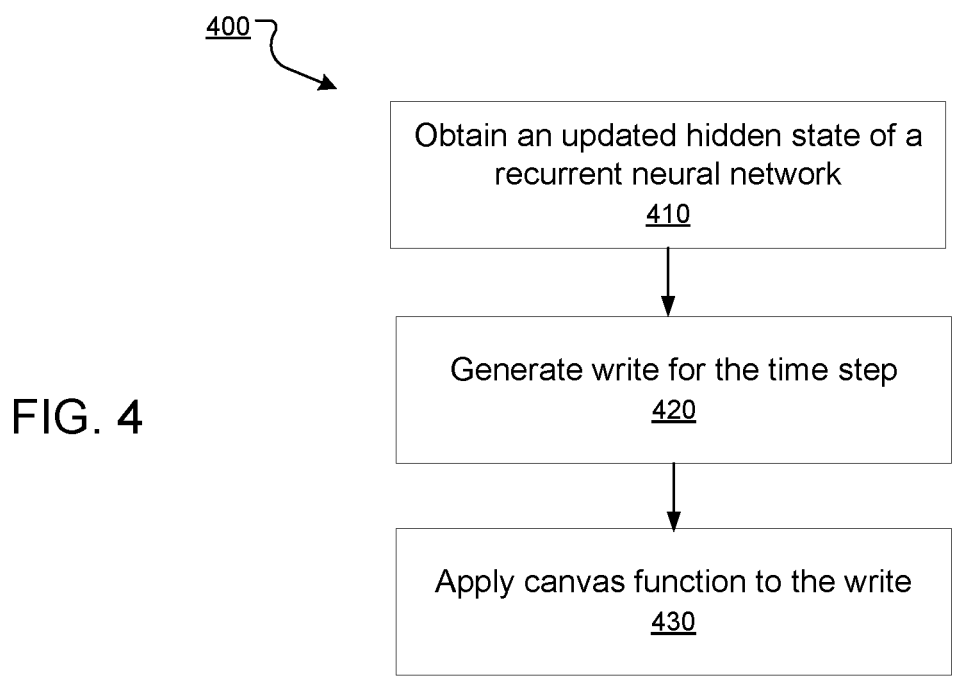
FIG. 4 is a flow chart an example process for updating a hidden canvas at a time step.

FIG. 4 is a flow chart of an example process 400 for updating a hidden canvas at a time step. For convenience, the process 400 will be described as being performed by a system of one or more computers located in one or more locations. For example, a neural network system, e.g., the neural network system 100 of FIG. 1, appropriately programmed in accordance with this specification, can perform the process 400.

The system obtains an updated hidden state of a recurrent neural network (410) for the time step, e.g., the updated hidden state 121 of a time step of the neural network system 100 of FIG. 1.

The system generates a write for the time step by processing the updated hidden state using a writing mechanism (420). For example, this may be performed by the generative subsystem of a neural network system such as the neural network system 100 of FIG. 1. The write is a transformation of the updated hidden state of the recurrent neural network.

In some implementations, the writing mechanism is represented by a writing function, which may be a non-linear transformation function. The system applies the writing function to the updated hidden state of the time step to generate the write.

In some implementations, the writing mechanism is an attention-based writing mechanism, such as an attention-based writing mechanism that uses a spatial transformers function. An attention-based writing mechanism that uses a special transformers function can provide invariance to shape and size of objects in input data items that include input images. This may enable the system to independently handle position, scale, rotation, and content of a system output that is a reconstruction of an input image.

In some implementations, the special transformers function performs the following operations:

$$ST(x,\lambda) = [\kappa_h(\lambda) \otimes \kappa_w(\lambda)] * x,$$

where x is an input image that needs to be transformed using the hidden canvas, $\lambda$ is the set of parameters of the function, $k_h$ and $k_w$ are 1-dimensional kernels, $\otimes$ indicates the tensor outer-product of the two kernels, and * indicates a convolution. The input image and the parameters are obtained based on the updated hidden state for the time step.

In some of those implementations, the updated hidden state for the time step is an image, i.e., a. The system resizes the image to generate the input image, e.g., using a spatial transformer function or a convolutional neural network.

In other implementations, the updated hidden state for the time step is a 2-dimensional object. The system reshapes the object into an image and resizes the image to generate the input image.

The system applies a canvas function to the write to combine the write with the hidden canvas to generate the updated hidden canvas for the time step (430). For example, this may be performed by the generative subsystem of a neural network system such as the neural network system 100 of FIG. 1.

In some implementations, the canvas function is an additive canvas function. In those implementations, the system adds the write to the hidden canvas to generate the updated hidden canvas for the time step.

In some other implementations, the system applies the canvas function by processing the write and the current hidden canvas using a convolutional gated recurrent unit (CGRU) neural network to generate the updated canvas.

Figure 5:
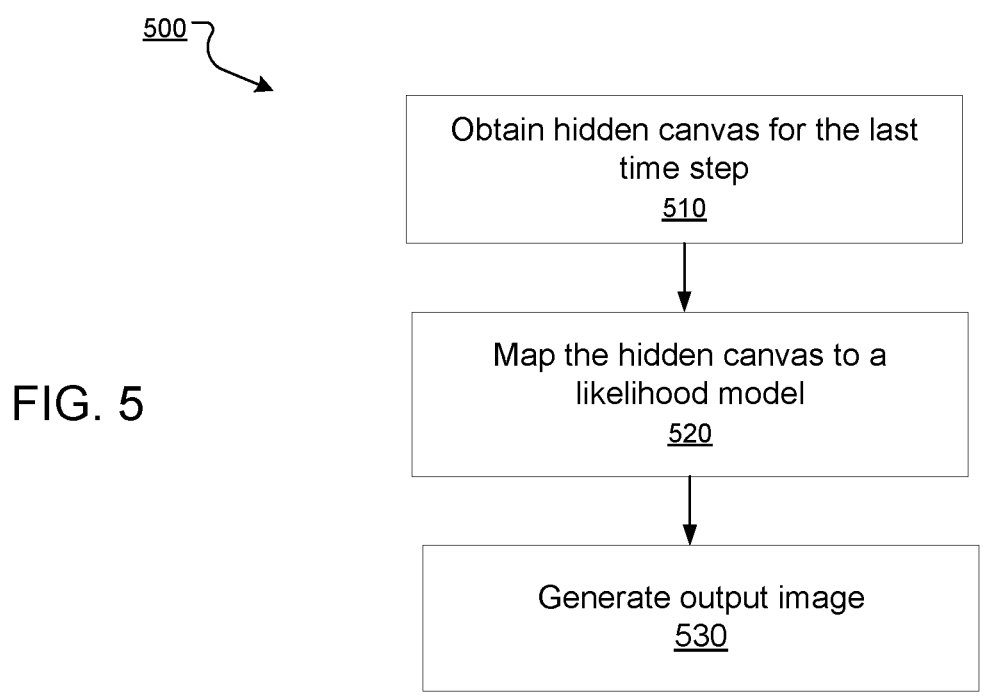
FIG. 5 is a flow chart of an example process for generating an output image using an updated hidden canvas for a last time step.

FIG. 5 is a flow chart of an example process 500 for generating an output image using an updated hidden canvas for a last time step. For convenience, the process 500 will be described as being performed by a system of one or more computers located in one or more locations. For example, a neural network system, e.g., the neural network system 100 of FIG. 1, appropriately programmed in accordance with this specification, can perform the process 500.

The system obtains the hidden canvas for the last, i.e., final, time step (510).

The system maps the updated hidden canvas for the last time step to sufficient statistics of a likelihood model using an observation function (520). For example, this may be performed by the generative subsystem of a neural network system such as the neural network system 100 of FIG. 1.

In some implementations, the likelihood model is a Bernoulli likelihood model for binary data.

In some implementations, the likelihood model is a multinomial or softmax likelihood model, e.g., for color data.

In some implementations, the likelihood model is a Gaussian likelihood model.

In some implementations, the likelihood model represents a probability P(x|z), where x is the set of values of the output image and z is a set of latent variables. In those implementations, the likelihood model may represent any probability distribution that is appropriate for the input data and is dependent in a non-linear way on the latent variables.

In some implementations, the system processes the updated hidden canvas using the observation function and a set of parameters to generate the sufficient statistics of the likelihood model.

In some implementations, the canvas has the same spatial dimensions as the output image. In these implementations, the observation function is a 1×1 convolution that is applied over the canvas.

In some other implementations, the canvas has different spatial dimensions from the output image. In these implementations, the observation function is one or more convolutional layers that generate an output feature map having the spatial dimensions of the output image from the canvas.

The system generates the output image by sampling from the likelihood model (530). For example, this may be performed by the generative subsystem of a neural network system such as the neural network system 100 of FIG. 1.

Figure 6:
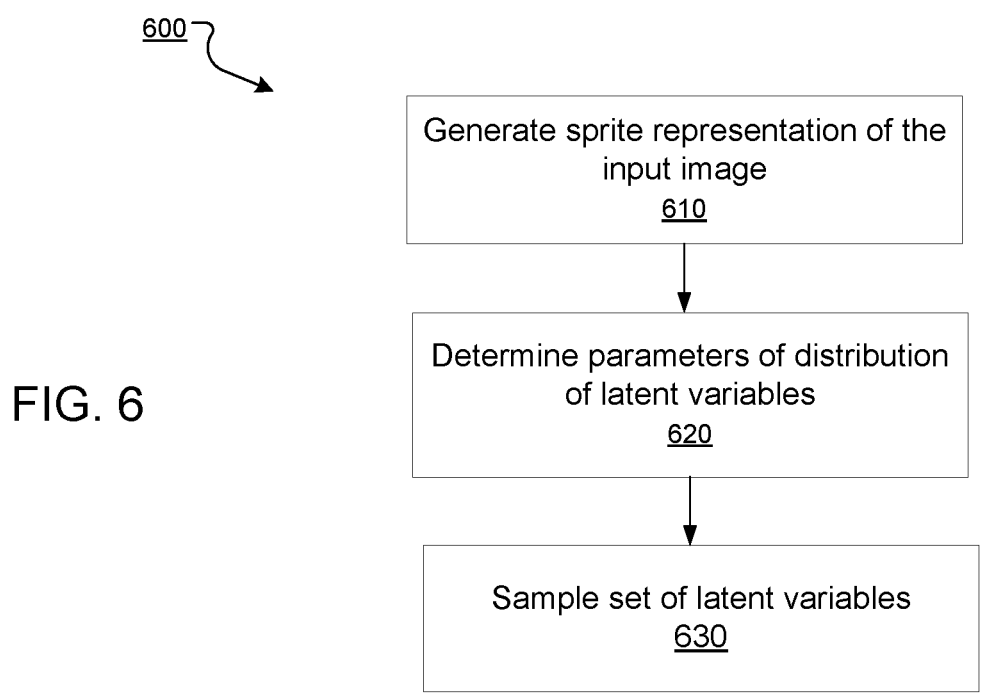
FIG. 6 is a flow chart of an example process for sampling a set of latent variables for each time step during the reconstruction of an input image.

FIG. 6 is a flow chart of an example process 600 for sampling a set of latent variables for each time step during the reconstruction of an input image. For convenience, the process 600 will be described as being performed by a system of one or more computers located in one or more locations. For example, a neural network system, e.g., the neural network system 100 of FIG. 1, appropriately programmed in accordance with this specification, can perform the process 400.

The system generates a sprite representation of the input image by applying a reading function to the input image and the hidden state of a recurrent neural network of the system for a preceding time step (610).

In some implementations, system is configured to perform the following operations:

$$r_t = f_r(x, h_{t-1}; \varphi_r)$$

where $r_t$ is the sprite representation of the input image x, $f_r$ is a reading function, $h_{t-1}$ is the updated hidden state 121 of the recurrent neural network 101 for a previous time step, and $\varphi_r$ are the parameters of the reading function.

The reading function uses an attention-based writing mechanism. In some implementations, the attention-based writing mechanism uses a spatial transformers function. In some of those implementations, the system can set the parameters of the special transformers function to increase dimensions of the input image.

The system determines parameters of a distribution of latent variables using the sprite representation and the hidden state of the recurrent neural network (620).

In some implementations, the system performs a non-linear transformation on the sprite representation and the hidden state of the recurrent neural network in accordance with a set of learned parameters for the sprite representation to generate the parameters of a distribution of latent variables. The system can perform the non-linear transformation using a neural network that includes at least one of fully-connected and convolutional layers. The parameters of a distribution of latent variables can include a mean and variance of the distribution.

The system samples each latent variable for the time step from a distribution in accordance with the determined parameters (630). In some implementations, the system samples each latent variable from a respective distribution that is parameterized by a corresponding subset of the determined parameters.

Figure 7:
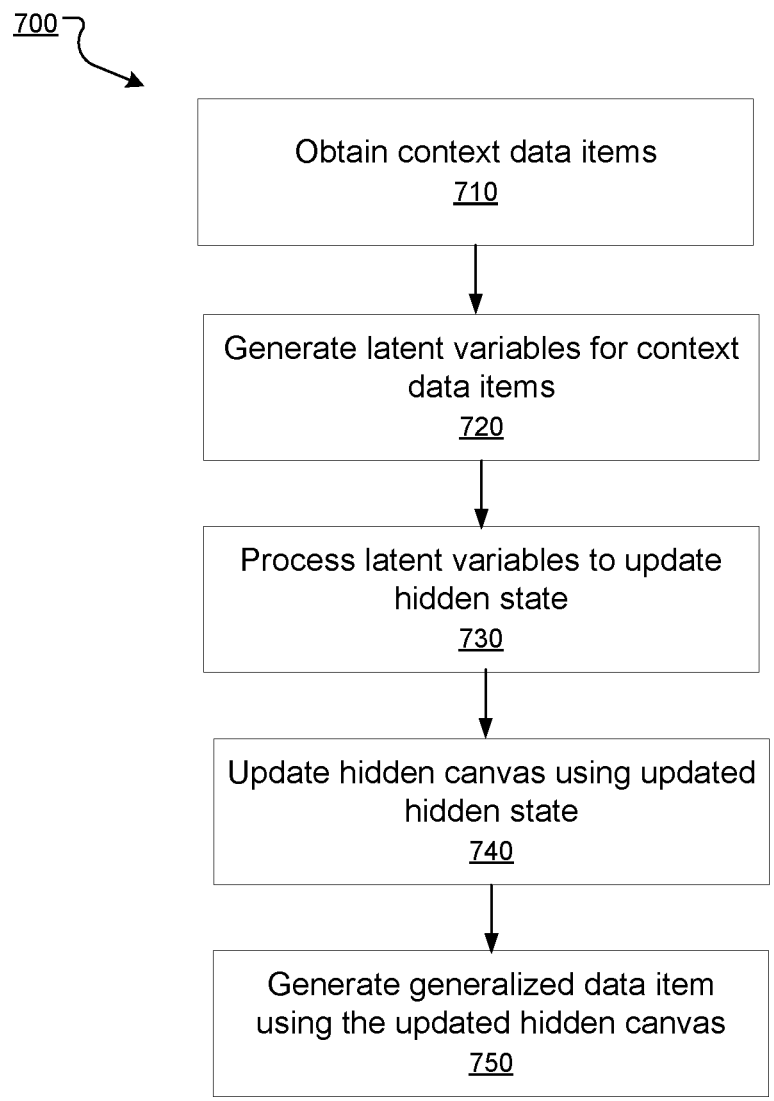
FIG. 7 is a flow chart of an example process for generating data items using one-shot generalization.

FIG. 7 is a flow chart of an example process 700 for generating data items using one-shot generalization. For convenience, the process 700 will be described as being performed by a system of one or more computers located in one or more locations. For example, a neural network system, e.g., the neural network system 100 of FIG. 1, appropriately programmed in accordance with this specification, can perform the process 700.

The system obtains one or more context data items (710). In some implementations, the context data items are images.

At each time step of multiple time steps, the system generates a set of latent variables for the one or more context data items (720).

At each time step, the system processes the set of latent variables for the time step to update a hidden state of a neural network of the system for the time step (730).

At each time step, the system uses the updated hidden state of the recurrent neural network for the time step to update a hidden canvas (740). Updating the hidden canvas using the updated hidden state of the recurrent neural network is described in greater detail above with reference to FIG. 4.

The system uses the updated hidden canvas obtained after the final time step of the multiple time steps to generate a generalized data item for the one or more context images (750). A generalized data item for a particular data item is a new data item that captures some characteristics of the particular data item but is a variation of the particular data item.

Generating a data item using a final hidden canvas is described in greater detail above with reference to FIG. 5.

Figure 8:
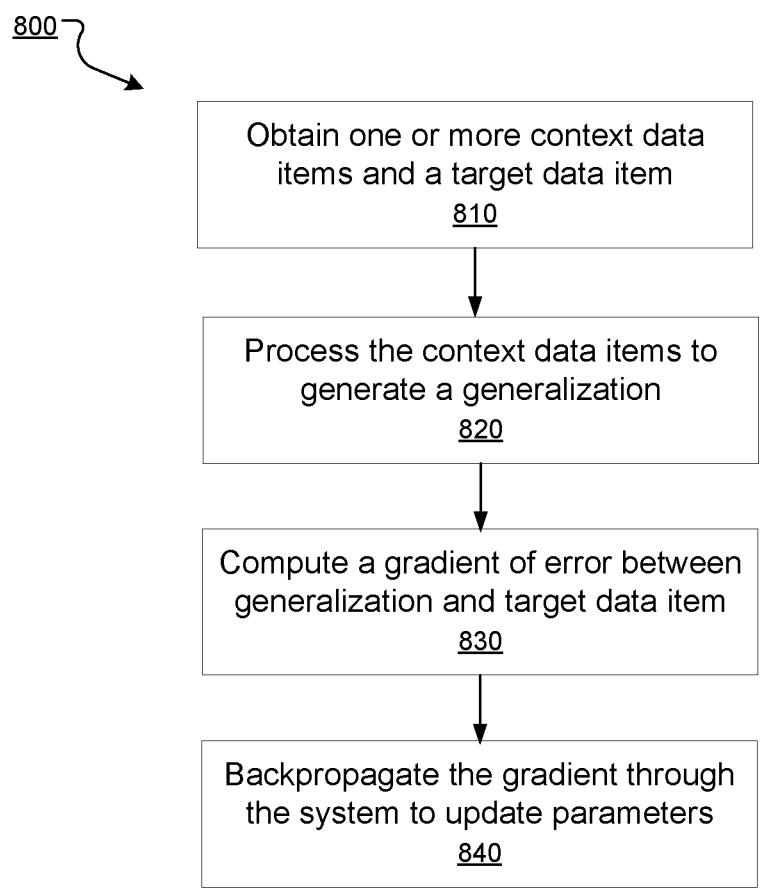
FIG. 8 is a flow chart of an example process for training a neural network system to perform one-shot generalization of data items.

FIG. 8 is a flow chart of an example process 800 for training a neural network system to perform one-shot generalization of data items. For convenience, the process 800 will be described as being performed by a system of one or more computers located in one or more locations.

The system obtains one or more context data items and a target data item (810). The target data item is a generalization of the one or more context data items.

The system processes the one or more context data items through the neural network system to generate a generalized data item for the one or more context data items (820). A generalized data item for a particular data item is a new data item that captures some characteristics of the particular data item but is a variation of the particular data item. Processing a group of data items through a neural network system to generate a generalized data item for the group is described in greater detail above with reference to FIG. 8.

The system computes a gradient of a measure of error between the generalized data item and the target data item (830) and backpropagates the gradient through the neural network system to update one or more parameters of the neural network system (840).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system implemented by one or more computers, the neural network system comprising:
    a recurrent neural network that is configured to, for each time step of a predetermined number of time steps, receive a set of latent variables for the time step and process the set of latent variables to update a hidden state of the recurrent neural network; and
    a generative subsystem that is configured to:
    receive one or more context images;
    for each time step of the predetermined number of time steps:

generate the set of latent variables for the time step from the one more context images and provide the set of latent variables as input to the recurrent neural network;

update a hidden canvas using the updated hidden state of the recurrent neural network; and for a last time step of the predetermined number of time steps:

generate an output image using the updated hidden canvas for the last time step.

2. The neural network system of claim 1, wherein the recurrent neural network is a long short-term memory (LSTM) neural network.

3. The neural network system of claim 1, wherein updating the hidden canvas using the updated hidden state of the recurrent neural network comprises:

generating a write for the time step by processing the hidden state using a writing mechanism; and applying a canvas function to the write to combine the write with the hidden canvas to generate the updated hidden canvas for the time step.

4. The neural network system of claim 3, wherein the writing mechanism is an attention- based writing mechanism.

5. The neural network system of claim 4, wherein the attention-based writing mechanism uses a spatial transformers function.

6. The neural network system of claim 3, wherein the canvas function is an additive canvas function.

7. The neural network system of claim 3, wherein the canvas function is a gated recurrent canvas function.

8. The neural network system of claim 1, wherein generating an output image using the updated hidden canvas for the last time step comprises:

mapping the updated hidden canvas for the last time step to sufficient statistics of a likelihood model using an observation function; and generating the output image by sampling from the likelihood model.

9. The neural network system of claim 1, wherein the neural network system further comprises:

an inference subsystem, wherein the inference subsystem is configured to, for each of the predetermined number of time steps:

generate a sprite representation of the one or more context images by applying a reading function to the one or more context images and the hidden state of the recurrent neural network;

determine parameters of a distribution of latent variables using the sprite representation and the hidden state of the recurrent neural network; and sample the set of latent variables for the time step from the distribution in accordance with the determined parameters.

10. A method comprising:

at a generative subsystem of a neural network system implemented by one or more computers, receiving one or more context images;

for each time step of a predetermined number of time steps: an updated hidden state of the recurrent neural network;

generating a set of latent variables for the time step from the one or more context images and providing the set of latent variables as input to a recurrent neural network receiving, as output from the recurrent neural network of the neural network system, an updated hidden state of the recurrent neural network; and updating a hidden canvas using the updated hidden state of the recurrent neural network; and for a last time step of the predetermined number of time steps, generating an output image using the updated hidden canvas for the last time step.

11. The method of claim 10, wherein the recurrent neural network is a long short-term memory (LSTM) neural network.

12. The method of claim 10, wherein updating the hidden canvas using the updated hidden state of the recurrent neural network comprises:

generating a write for the time step by processing the hidden state using a writing mechanism; and applying a canvas function to the write to combine the write with the hidden canvas to generate the updated hidden canvas for the time step.

13. The method of claim 12, wherein the writing mechanism is an attention-based writing mechanism.

14. The method of claim 13, wherein the attention-based writing mechanism uses a spatial transformers function.

15. The method of claim 12, wherein the canvas function is an additive canvas function or is a gated recurrent canvas function.

16. The method of claim 10, wherein generating an output image using the updated hidden canvas for the last time step comprises:

mapping the updated hidden canvas for the last time step to sufficient statistics of a likelihood model using an observation function; and generating the output image by sampling from the likelihood model.

17. The method of claim 10, wherein the method further comprises, at an inference subsystem of the neural network system, generating a sprite representation of the one or more context images by applying a reading function to the one or more context images and the hidden state of the recurrent neural network;

determining parameters of a distribution of latent variables using the sprite representation and the hidden state of the recurrent neural network; and sampling the set of latent variables for the time step from the distribution in accordance with the determined parameters.

18. A non-transitory computer-readable storage medium encoded with instructions that, when executed by one or more computers, cause the one or more computers to perform operations comprising:

at a generative subsystem of a neural network system implemented by one or more computers, receiving one or more context images;

for each time step of a predetermined number of time steps:

generating a set of latent variables for the time step from the one or more context images and providing the set of latent variables as input to a recurrent neural network receiving, as output from the recurrent neural network of the neural network system, an updated hidden state of the recurrent neural network; and updating a hidden canvas using the updated hidden state of the recurrent neural network; and for a last time step of the predetermined number of time steps, generating an output image using the updated hidden canvas for the last time step.

19. The non-transitory computer-readable storage medium of claim 18, wherein the output image is a reconstruction of an input image, and wherein the operations further comprise, at an inference subsystem of the neural network system,
- generating a sprite representation of the input image by applying a reading function to the input image and the hidden state of the recurrent neural network;
- determining parameters of a distribution of latent variables using the sprite representation and the hidden state of the recurrent neural network; and
- sampling the set of latent variables for the time step from the distribution in accordance with the determined parameters.

20. The non-transitory computer-readable storage medium of claim 18, wherein updating the hidden canvas using the updated hidden state of the recurrent neural network comprises:
- generating a write for the time step by processing the hidden state using a writing mechanism; and
- applying a canvas function to the write to combine the write with the hidden canvas to generate the updated hidden canvas for the time step.

* * * * *